United States Patent
Chiu et al.

(10) Patent No.: US 12,259,996 B2
(45) Date of Patent: Mar. 25, 2025

(54) METHOD OF PROTECTING DATA AND COMPUTER DEVICE

(71) Applicant: HON HAI PRECISION INDUSTRY CO., LTD., New Taipei (TW)

(72) Inventors: Liang-Te Chiu, New Taipei (TW); Wun-Cing Lai, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 476 days.

(21) Appl. No.: 17/552,871

(22) Filed: Dec. 16, 2021

(65) Prior Publication Data
US 2022/0198051 A1 Jun. 23, 2022

(30) Foreign Application Priority Data

Dec. 22, 2020 (CN) .......................... 202011531688.8

(51) Int. Cl.
*G06F 21/64* (2013.01)
*G06F 21/60* (2013.01)
(Continued)

(52) U.S. Cl.
CPC ........ *G06F 21/6227* (2013.01); *G06F 21/602* (2013.01); *G06F 21/64* (2013.01); *H04L 9/0825* (2013.01); *H04L 9/50* (2022.05)

(58) Field of Classification Search
CPC . H04L 9/3255; H04L 9/14; H04L 9/30; H04L 9/50; H04L 9/0833; H04L 9/3066; H04L 9/3239; H04L 9/3252; G06F 21/64
See application file for complete search history.

(56) References Cited

U.S. PATENT DOCUMENTS 10,979,410 B1 * 4/2021 Byrd .................. H04L 63/0428
11,265,169 B1 * 3/2022 Rowe ........................ H04L 9/30
(Continued)

FOREIGN PATENT DOCUMENTS

CN 108881262 A 11/2018
CN 110264354 9/2019
(Continued)

OTHER PUBLICATIONS http://frogledd887.blogspot.com/2017/04/blog-post.html, Liou's: Digital Signature, Digital Envelope, Digital Certificate, Apr. 23, 2017.

*Primary Examiner* — Sarah Su
*Assistant Examiner* — Vladimir I Gavrilenko
(74) *Attorney, Agent, or Firm* — ScienBiziP, P.C.

(57) ABSTRACT

A method of protecting data applied in a computer device is provided. A designated file is encrypted by using a symmetric key to obtain an encrypted file. The symmetric key is encrypted by using a first public key of a first pair of keys and a first ciphertext is obtained. Information related to the designated file is obtained, and the related information of the designated file is uploaded to a blockchain. When decrypting the encrypted file, the related information of the designated file is downloaded from the blockchain to obtain the related information of the designated file. The symmetric key is obtained by decrypting a first ciphertext of the related information by using a first private key of the first pair of keys, and a decrypted file is obtained by decrypting the encrypted file by using the symmetric key.

6 Claims, 4 Drawing Sheets

(51) Int. Cl.
*G06F 21/62* (2013.01)
*H04L 9/08* (2006.01)
*H04L 9/00* (2022.01)

(56) References Cited

U.S. PATENT DOCUMENTS

| | | | |
|---|---|---|---|
| 11,528,127 B2* | 12/2022 | Wright | H04L 9/3066 |
| 2019/0163912 A1* | 5/2019 | Kumar | H04L 41/08 |
| 2019/0356529 A1* | 11/2019 | Gulati | H04L 9/3268 |
| 2020/0162238 A1* | 5/2020 | Yoon | G06F 21/64 |
| 2022/0019425 A1* | 1/2022 | Yang | G06F 21/16 |

FOREIGN PATENT DOCUMENTS

| | | |
|---|---|---|
| TW | 202023235 | 6/2020 |
| WO | 2019127265 A1 | 7/2019 |

* cited by examiner

METHOD OF PROTECTING DATA AND COMPUTER DEVICE

CROSS-REFERENCE TO RELATED APPLICATIONS

This application claims priority to Chinese Patent Application No. 202011531688.8 filed on Dec. 22, 2020, in China Intellectual Property Administration, the contents of which are incorporated by reference herein.

FIELD

The present disclosure relates to data security, in particular to a method of protecting data, and a computer device.

BACKGROUND

Common encryption methods include a symmetric encryption and an asymmetric encryption. However, because the symmetric encryption uses a same key to encrypt and decrypt files, security of the files may be low and the key can be obtained from several sources. The asymmetric encryption includes a pair of public and private keys. Specifically, the file is encrypted with the public key and decrypted with the private key. However, this method is limited to one private user for decryption, and cannot be used by multiple people, which may be inconvenient.

DETAILED DESCRIPTION

In order to provide a more clear understanding of the objects, features, and advantages of the present disclosure, the same are given with reference to the drawings and specific embodiments. It should be noted that the embodiments in the present disclosure and the features in the embodiments may be combined with each other without conflict.

In the following description, numerous specific details are set forth in order to provide a full understanding of the present disclosure. The present disclosure may be practiced otherwise than as described herein. The following specific embodiments are not to limit the scope of the present disclosure.

Unless defined otherwise, all technical and scientific terms herein have the same meaning as used in the field of the art technology as generally understood. The terms used in the present disclosure are for the purposes of describing particular embodiments and are not intended to limit the present disclosure.

Figure 1:
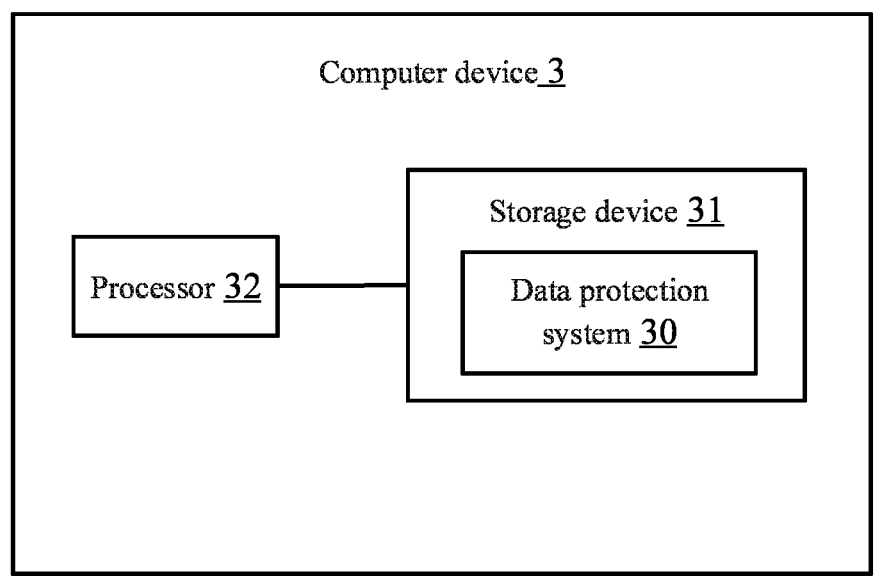
FIG. 1 illustrates a schematic diagram of a computer device according to one embodiment of the present disclosure.

FIG. 1 illustrates a schematic diagram of a computer device of the present disclosure.

In at least one embodiment, the computer device 3 includes a storage device 31, at least one processor 32. The storage device 31 and the at least one processor 32 are in electrical communication with each other.

Those skilled in the art should understand that the structure of the computer device 3 shown in FIG. 1 does not constitute a limitation of the embodiment of the present disclosure. The computer device 3 can further include more or less other hardware or software than that shown in FIG. 1, or the computer device 3 can have different component arrangements.

It should be noted that the computer device 3 is merely an example. Another device adapted to the present disclosure should also be included in the protection scope of the present disclosure, and incorporated herein by reference In some embodiments, the storage device 31 may be used to store program codes and various data of computer programs. For example, the storage device 31 may be used to store a data protection system 30 installed in the computer device 3 and implement completion of storing programs or data during an operation of the computer device 3. The storage device 31 may include Read-Only Memory (ROM), Programmable Read-Only Memory (PROM), and Erasable Programmable Read-Only Memory (EPROM), One-time Programmable Read-Only Memory (OTPROM), Electronically-Erasable Programmable Read-Only Memory (EEPROM), Compact Disc (Compact Disc) Read-Only Memory (CD-ROM) or other optical disk storage, disk storage, magnetic tape storage, or any other non-transitory computer-readable storage medium that can be used to carry or store data.

In some embodiments, the at least one processor 32 may be composed of an integrated circuit. For example, the at least one processor 32 can be composed of a single packaged integrated circuit or can be composed of multiple packaged integrated circuits with the same function or different functions. The at least one processor 32 includes one or more central processing units (CPUs), one or more microprocessors, one or more digital processing chips, one or more graphics processors, and various control chips. The at least one processor 32 is a control unit of the computer device 3. The at least one processor 32 uses various interfaces and lines to connect various components of the computer device 3, and executes programs or modules or instructions stored in the storage device 31, and invokes data stored in the storage device 31 to perform various functions of the computer device 3 and to process data, for example, perform a function of processing files, such as encrypting files and decrypting encrypted files (for details, see the description of FIG. 3 and FIG. 4).

In this embodiment, the data protection system 30 can include one or more modules. The one or more modules are stored in the storage device 31 and are executed by at least one processor (e.g., processor 32 in this embodiment), such that a function of processing files (for details, see the introduction to FIG. 3 and FIG. 4 below) is achieved.

Figure 2:
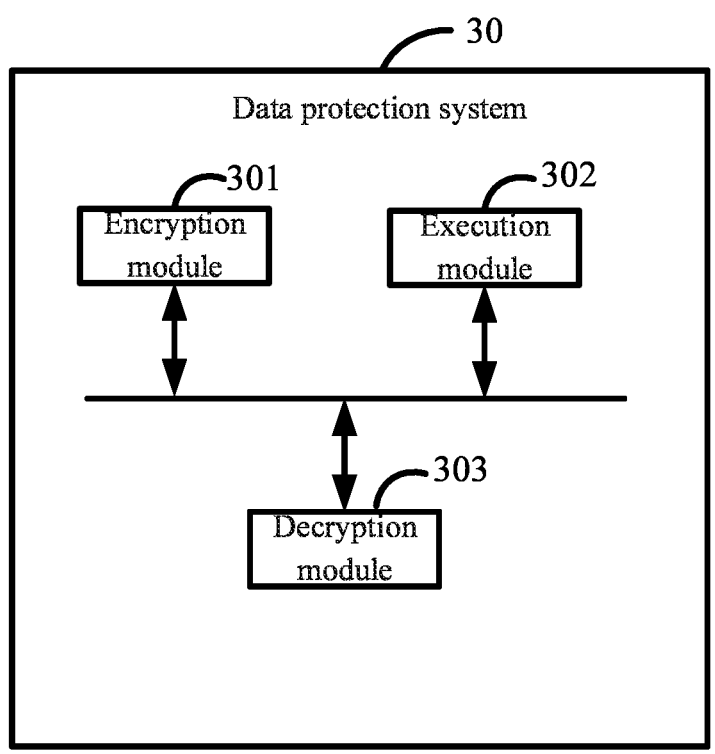
FIG. 2 shows one embodiment of modules of a data protection system of the present disclosure.

In this embodiment, the data protection system 30 can include a plurality of modules. Referring to FIG. 2, the plurality of modules includes an encryption module 301, an execution module 302, and a decryption module 303. The modules referred to in the present disclosure refer to a series of computer-readable instructions that can be executed by at least one processor (for example, the processor 32), and can complete functions, and can be stored in a storage device (for example, the storage device 31 of the computer device 3). In this embodiment, functions of each module will be described in detail with reference to FIG. 3 and FIG. 4.

Figure 3:
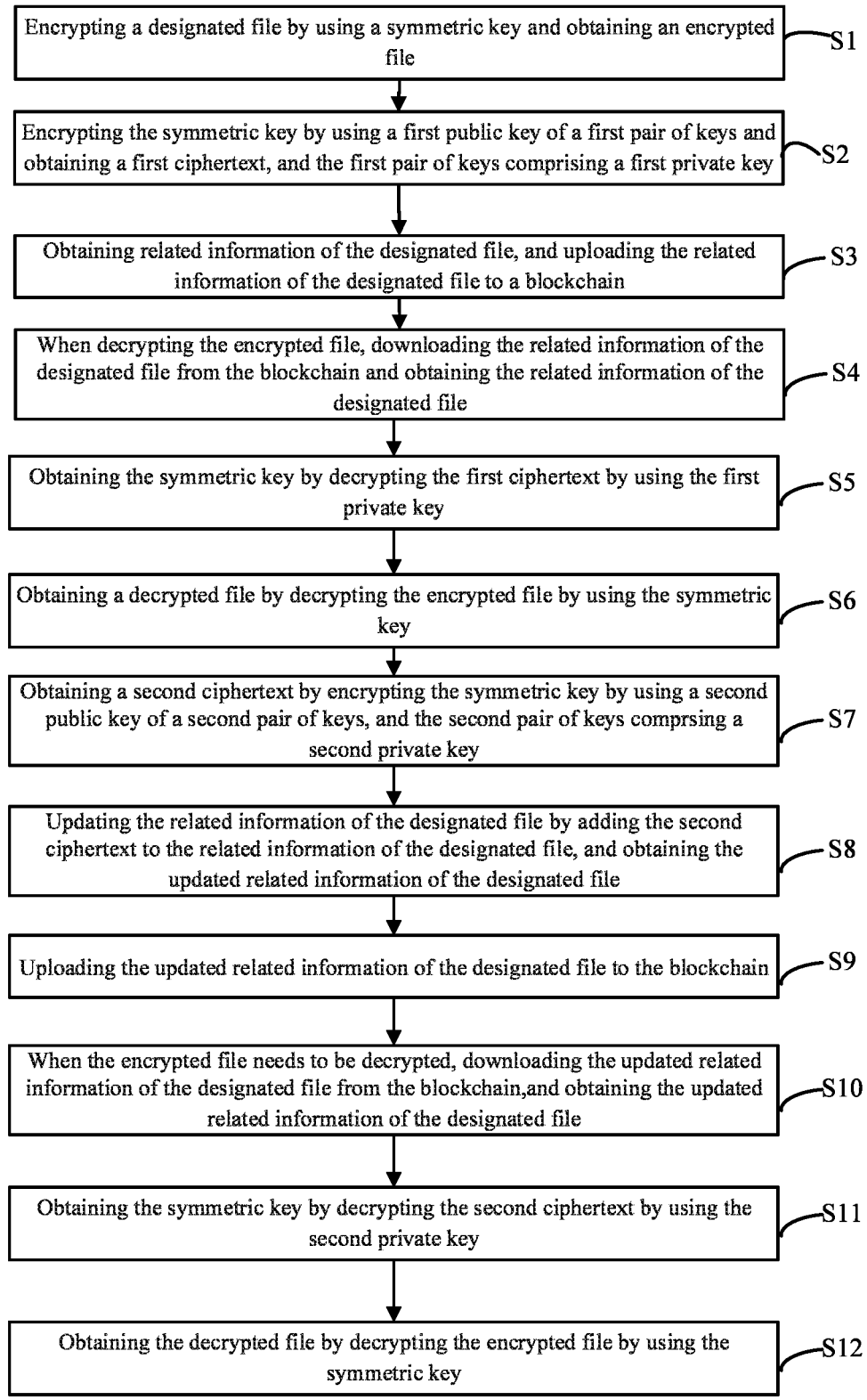
FIG. 3 shows a first flow chart of one embodiment of a method of protecting data of the present disclosure.
Figure 4:
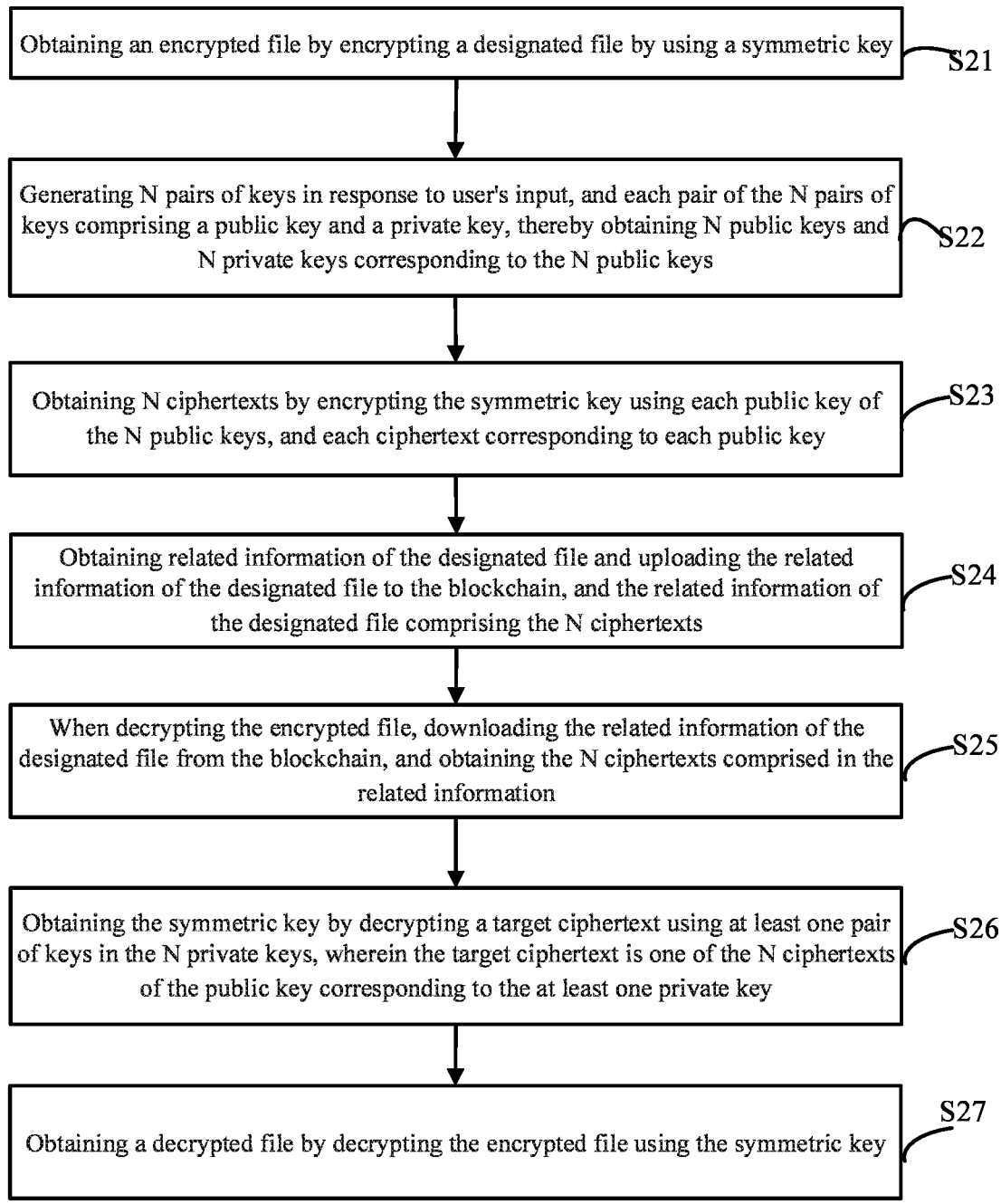
FIG. 4 shows a second flow chart of one embodiment of the method of protecting data of the present disclosure.

In this embodiment, an integrated unit implemented in a form of a software module can be stored in a non-transitory readable storage medium. The above modules include one or more computer-readable instructions. The computer device 3 or a processor implements the one or more computer-readable instructions, such that the method for processing files shown in FIG. 3 and FIG. 4 is achieved.

In a further embodiment, referring to FIG. 2, the at least one processor 32 can execute an operating system of the computer device 3, various types of applications (such as the data protection system 30 described above), program codes, and the like.

In a further embodiment, the storage device 31 stores program codes of a computer program, and the at least one processor 32 can invoke the program codes stored in the storage device 31 to achieve related functions. For example, each module of the data protection system 30 shown in FIG. 2 is program code stored in the storage device 31. Each module of the data protection system 30 shown in FIG. 2 is executed by the at least one processor 32, such that the functions of the modules are achieved, and the purpose of processing files (see the description of FIG. 3 and FIG. 4 below for details) is achieved.

In one embodiment of the present disclosure, the storage device 31 stores one or more computer-readable instructions, and the one or more computer-readable instructions are executed by the at least one processor 32 to achieve a purpose of processing files. Specifically, the computer-readable instructions executed by the at least one processor 32 to achieve the purpose of processing files is described in detail in FIG. 3 and FIG. 4 below.

It should be noted that, in other embodiments, the data protection system 30 may also be implemented as an embedded system with a storage device, a processor, and other necessary hardware or software.

FIG. 3 is a first flowchart of a method of protecting data according to a preferred embodiment of the present disclosure.

In this embodiment, the method of protecting data can is applied to the computer device 3. For the computer device 3 that requires processing files, the computer device 3 can be directly integrated with the function of processing files. The computer device 3 can also achieve the function of processing files by running a Software Development Kit (SDK).

FIG. 3 shows a first flow chart of one embodiment of a method of protecting data. Referring to FIG. 3, the method is provided by way of example, as there are a variety of ways to carry out the method. The method described below can be carried out using the configurations illustrated in FIG. 1, for example, and various elements of these figures are referenced in explanation of method. Each block shown in FIG. 3 represents one or more processes, methods, or subroutines, carried out in the method. Furthermore, the illustrated order of blocks is illustrative only and the order of the blocks can be changed. Additional blocks can be added or fewer blocks can be utilized without departing from this disclosure. The example method can begin at block S1.

At block S1, the encryption module 301 encrypts a designated file by using a symmetric key and obtains an encrypted file.

In this embodiment, the designated file can be a file in any format. For example, the designated file can be a file in .doc, .xls or another format.

In one embodiment, the encryption module 301 also calculates an MD5 (Message-Digest Algorithm) value of the designated file before encrypting the designated file using the symmetric key. In order to facilitate a clear and simple description of the present disclosure, the MD5 value calculated here is called the "first MD5 value".

In one embodiment, after obtaining the encrypted file, the encryption module 301 also stores the encrypted file in a designated location. The designated location may be a local storage device such as a storage device 31 of the computer device 3, or a cloud server communicatively connected with the computer device 3.

At block S2, the encryption module 301 encrypts the symmetric key by using a first public key of a first pair of keys and obtains a first ciphertext. The first pair of keys also includes a first private key.

In this embodiment, the first pair of keys are asymmetric keys. The first private key is used to decrypt the file encrypted with the first public key.

At block S3, the execution module 302 obtains related information of the designated file, and uploads the related information of the designated file to a blockchain, wherein the related information of the designated file includes the first ciphertext.

In one embodiment, the related information of the designated file further includes the first MD5 value.

In one embodiment, the related information of the designated file further includes information as to the designated location. The information of the designated location is a path or URL for obtaining the encrypted file from the designated location.

In an embodiment, the related information of the designated file further includes the first public key.

At block S4, when the encrypted file needs to be decrypted, the execution module 302 downloads the related information of the designated file from the blockchain, thereby obtaining the related information of the designated file such as the first ciphertext, the first MD5 value, the information of the designated location, and the first public key.

In one embodiment, when the execution module 302 obtains the information of the designated location, the execution module 302 may obtain the encrypted file based on the information of the designated location. For example, the encrypted file can be directly and quickly obtained according to the path or URL of the encrypted File, thereby allowing the execution module 302 to quickly obtain the encrypted file.

At block S5, the decryption module 303 obtains the symmetric key by decrypting the first ciphertext by using the first private key.

At block SC, the decryption module 303 obtains a decrypted file by decrypting the encrypted file by using the symmetric key.

In one embodiment, when the decrypted file is obtained, the decryption module 303 also calculates an MD5 value of the decrypted file (the MD5 value applied at this point is called "second MD5 value").

The decryption module 303 also compares the first MD5 value and the second MD5 value to verify the decrypted file.

Specifically, when the first MD5 value is equal to the second MD5 value, the decryption module 303 determines that the decrypted file is a correct file. When the first MD5 value is not equal to the second MD5 value, the decryption module 303 determines that the decrypted file is a modified file and is an incorrect file.

In other embodiments, the present disclosure may further include blocks S7-S11.

At block S7, the encryption module 301 obtains a second ciphertext by encrypting the symmetric key by using a second public key of a second pair of keys. The second pair of keys further includes a second private key.

In this embodiment, the second pair of keys are asymmetric keys. The second private key is used to decrypt the file encrypted with the second public key.

At block S8, the execution module 302 updates the related information of the designated file by adding the second ciphertext to the related information of the designated file, and obtains the updated related information of the designated file.

In one embodiment, the execution module 302 also adds the second public key to the related information of the designated file at the same time to update the related information of the designated file.

At block S9, the execution module 302 uploads the updated related information of the designated file to the blockchain.

At block S10, when the encrypted file needs to be decrypted, the execution module 302 downloads the updated related information of the designated file from the blockchain, thereby obtaining the updated related information of the designated file such as the first ciphertext, the first MD5 value, the information of the designated location, the first public key, the second ciphertext, and the second public key.

Similarly, when the execution module 302 obtains the information of the designated location, the execution module 302 can obtain the encrypted file based on the information of the designated location. For example, the encrypted file can be directly and quickly obtained according to the path or URL of the encrypted file, thereby allowing the execution module 302 to quickly obtain the encrypted file.

At block S11, the decryption module 303 obtains the symmetric key by decrypting the second ciphertext, by using the second private key.

At block S12, the decryption module 303 obtains the decrypted file by decrypting the encrypted file by using the symmetric key.

Similarly, when the decrypted file is obtained, the decryption module 303 also calculates the second. MD5 value of the decrypted file, and compares the first MD5 value and the second MD5 value to verify the decrypted file.

FIG. 4 is a second flowchart of a method of protecting data provided by a preferred embodiment of the present disclosure.

As shown in FIG. 4, the method of protecting data specifically includes the following blocks. According to different requirements, the order of the blocks in the flowchart can be changed, and some blocks can be omitted.

At block S21, the encryption module 301 obtains an encrypted file by encrypting a designated file using the symmetric key.

In this embodiment, the designated file can be in any format. For example, the designated file can be a file in .doc, .xls or another format.

In one embodiment, the encryption module 301 also calculates the first MD5 value of the designated file before encrypting the designated file with the symmetric key.

In one embodiment, after obtaining the encrypted file, the encryption module 301 also stores the encrypted file in a designated location. The designated location may be a local storage device of the computer device 3, such as the storage device 31, or a cloud server communicatively connected with the computer device 3.

At block S22, the encryption module 301 generates N pairs of keys in response to users input. Each pair of the N pairs of keys includes a public key and a private key, thereby obtaining N public keys and N private keys corresponding to the N public keys.

In this embodiment, the N pairs of keys are all asymmetric keys.

In this embodiment, the N is a positive integer, and the value of N can be equal to 1, 2, 3 or other value.

In one embodiment, the encryption module 301 may display a user interface on a display screen (not shown) of the computer device 3 for the user to input the value of N, thereby generating N pairs of keys in response to the user's input.

At block S23, the encryption module 301 obtains N ciphertexts by encrypting the symmetric key using each public key of the N public keys, such that a ciphertext corresponding to each public key is obtained.

At block S24, the execution module 302 obtains the related information of the designated file and uploads the related information of the designated file to the blockchain, wherein the related information of the designated file includes the N ciphertexts.

In one embodiment, the related information of the designated file further includes the first MD5 value.

In one embodiment, the related information of the designated file further includes information of the designated location. The information of the designated location is a path or URL for obtaining the encrypted file from the designated location.

In an embodiment, the related information of the designated file further includes the N public keys.

At block S25, when the encrypted file needs to be decrypted, the execution module 302 downloads the related information of the designated file from the blockchain, thereby obtaining the related information of the designated file such as the N ciphertexts, the first MD5 value, the information of the designated location, and the N public keys.

In one embodiment, when the execution module 302 obtains the information of the designated location, the execution module 302 may obtain the encrypted file based on the information of the designated location. For example, the encrypted file can be directly and quickly obtained according to the path or URL of the encrypted file, thereby allowing the execution module 302 to quickly obtain the encrypted file.

At block S26, the decryption module 303 obtains the symmetric key by decrypting a target ciphertext using at least one pair of keys in the N private keys, wherein the target ciphertext is one of the N ciphertexts of the public key corresponding to the at least one private key.

At block S27, the decryption module 303 obtains a decrypted file by decrypting the encrypted file using the symmetric key.

In one embodiment, when the decrypted file is obtained, the decryption module 303 also calculates a second MD5 value of the decrypted file.

The decryption module 303 also compares the first MD5 value and the second MD5 value to verify the decrypted file.

Specifically, when the first MD5 value is equal to the second MD5 value, the decryption module 303 determines that the decrypted file is not a modified file and is a correct file. When the first MD5 value is not equal to the second MD5 value, the decryption module 303 determines that the decrypted file is a modified file and is an incorrect file.

It should be noted that the second flow chart of the method of protecting data provided by the present disclosure can further include above blocks S7-S11 which are not repeated here.

The above description is only embodiments of the present disclosure, and is not intended to limit the present disclosure, and various modifications and changes can be trade to the present disclosure. Any modifications, equivalent substitutions, improvements, etc. made within the spirit and scope of the present disclosure are intended to be included within the scope of the present disclosure.

What is claimed is:

1. A method of protecting data comprising:
encrypting a designated file by using a symmetric key and obtaining an encrypted file;
encrypting the symmetric key by using a first public key of a first pair of keys and obtaining a first ciphertext, and the first pair of keys comprising a first private key;
obtaining related information of the designated file, and uploading the related information of the designated file to a blockchain, and the related information of the designated file comprising the first ciphertext;
after obtaining the encrypted file, storing the encrypted file in a designated location, wherein the related information of the designated file comprises the information of the designated location; and
when obtaining the designated location comprised in the information of the designated location from the blockchain, obtaining the encrypted file based on the information of the designated location;
when decrypting the encrypted file, downloading the related information of the designated file from the blockchain and obtaining the related information of the designated file;
obtaining the symmetric key by decrypting the first ciphertext comprised in the related information by using the first private key; and
obtaining a decrypted file by decrypting the encrypted file by using the symmetric key;
obtaining a second ciphertext by encrypting the symmetric key by using a second public key of a second pair of keys, and the second pair of keys comprising a second private key;
updating the related information of the designated file by adding the second ciphertext to the related information of the designated file, and obtaining an updated related information of the designated file;
uploading the updated related information of the designated file to the blockchain;
when decrypting the encrypted file, downloading the updated related information of the designated file from the blockchain, and obtaining the second ciphertext comprised in the updated related information;
obtaining the symmetric key by decrypting the second ciphertext by using the second private key; and
obtaining the decrypted file by decrypting the encrypted file by using the symmetric key.

2. The method of protecting data according to claim 1, wherein the information of the designated location is a path or URL for obtaining the encrypted file from the designated location.

3. A method of protecting data comprising:
obtaining an encrypted file by encrypting a designated file by using a symmetric key;
generating N pairs of keys in response to user's input, and each pair of the N pairs of keys comprising a public key and a private key, thereby obtaining N public keys and N private keys corresponding to the N public keys;
obtaining N ciphertexts by encrypting the symmetric key using each public key of the N public keys, and each ciphertext corresponding to each public key;
obtaining related information of the designated file and uploading the related information of the designated file to the blockchain, and the related information of the designated file comprising the N ciphertexts;
after obtaining the encrypted file, storing the encrypted file in a designated location, wherein the related information of the designated file comprises the information of the designated location; and
when obtaining the designated location comprised in the information of the designated location from the blockchain, obtaining the encrypted file based on the information of the designated location;
when decrypting the encrypted file, downloading the related information of the designated file from the blockchain, and obtaining the N ciphertexts comprised in the related information;
obtaining the symmetric key by decrypting a target ciphertext using at least one pair of keys in the N private keys, wherein the target ciphertext is one of the N ciphertexts of the public key corresponding to the at least one private key; and
obtaining a decrypted file by decrypting the encrypted file using the symmetric key.

4. The method of protecting data according to claim 3, wherein the information of the designated location is a path or URL for obtaining the encrypted file from the designated location.

5. A computer device comprising:
a storage device;
at least one processor; and
the storage device storing one or more programs, which when executed by the at least one processor, cause the at least one processor to:
encrypt a designated file by using a symmetric key and obtain an encrypted file;
encrypt the symmetric key by using a first public key of a first pair of keys and obtaining a first ciphertext, wherein the first pair of keys comprises a first private key;
obtain related information of the designated file, and upload the related information of the designated file to a blockchain, wherein the related information of the designated file comprises the first ciphertext;
after obtaining the encrypted file, store the encrypted file in a designated location, wherein the related information of the designated file comprises the information of the designated location; and
when obtaining the designated location comprised in the information of the designated location from the blockchain, obtain the encrypted file based on the information of the designated location;
when decrypting the encrypted file, download the related information of the designated file from the blockchain and obtain the related information of the designated file;
obtain the symmetric key by decrypting the first ciphertext comprised in the related information by using the first private key; and
obtain a decrypted file by decrypting the encrypted file by using the symmetric key;
obtain a second ciphertext by encrypting the symmetric key by using a second public key of a second pair of keys, wherein the second pair of keys comprises a second private key;
update the related information of the designated file by adding the second ciphertext to the related information of the designated file, and obtain an updated related information of the designated file;

upload the updated related information of the designated file to the blockchain;

when decrypting the encrypted file, download the updated related information of the designated file from the blockchain, and obtain the second ciphertext comprised in the updated related information;

obtain the symmetric key by decrypting the second ciphertext by using the second private key; and obtain the decrypted file by decrypting the encrypted file by using the symmetric key.

6. The computer device according to claim 5, wherein the information of the designated location is a path or URL for obtaining the encrypted file from the designated location.

* * * * *